United States Patent [19]

Tongu et al.

[11] Patent Number: 5,373,709
[45] Date of Patent: Dec. 20, 1994

[54] ABSORPTION TYPE REFRIGERATOR

[75] Inventors: Shinji Tongu; Kazumitsu Onoda, both of Shizuoka, Japan

[73] Assignee: Yazaki Corporation, Tokyo, Japan

[21] Appl. No.: 31,126

[22] Filed: Mar. 12, 1993

[30] Foreign Application Priority Data

Mar. 13, 1992 [JP] Japan .................. 4-055033

[51] Int. Cl.[5] .................. B25B 15/00; B25B 35/00
[52] U.S. Cl. .................. 62/476; 62/497
[58] Field of Search .............. 62/476, 495, 497, 101; 165/165

[56] References Cited

U.S. PATENT DOCUMENTS

| | | | |
|---|---|---|---|
| 1,735,869 | 11/1929 | Knight | 62/476 |
| 2,019,351 | 10/1935 | Lathrop | 165/165 |
| 3,177,930 | 4/1965 | Anderson | 62/476 |
| 3,287,928 | 11/1966 | Reid | 62/476 |
| 3,316,727 | 5/1967 | Bourne | 62/476 |
| 3,353,369 | 11/1967 | Whitlow | 62/476 |
| 4,126,014 | 11/1978 | Kay | 62/2 |

FOREIGN PATENT DOCUMENTS

| | | | |
|---|---|---|---|
| 1470541 | 2/1967 | France | 165/165 |
| 2269694 | 11/1975 | France | 165/165 |
| 2367265 | 10/1976 | France | 165/165 |
| 911136 | 4/1954 | Germany | 62/497 |

Primary Examiner—Henry A. Bennett
Assistant Examiner—William C. Doerrler
Attorney, Agent, or Firm—Sughrue, Mion, Zinn, Macpeak & Seas

[57] ABSTRACT

An absorption type refrigerator including a generator having an improved heat-exchange efficiency and which is compact and economical. The generator is constructed using a heat-exchanger made up of a bellows-fin formed by consecutively bending a thin plate into a wave-like form and seal plates attached to ends of the bellows-fin for sealingly separating chambers disposed on opposite sides of the bellows-fin. In constructing the generator using the heat-exchanger, the bellows-fin is transversely arranged so that a lower chamber is used as a combustion chamber and an exhaust path for a burner whereas a diluted solution is introduced into an upper chamber and discharged therefrom for circulation after generating vapor refrigerant and being converted into concentration solution. Alternatively, the bellows-fin is vertically arranged so that one of the chambers defined by the bellows-fin is used as the burner combustion chamber and exhaust path in which gas flows vertically from a lower portion to an upper portion thereof whereas the diluted solution is dripped vertically from an upper portion to a lower portion of the other chamber to form liquid layer falling film to be boiled and evaporated to generate vapor refrigerant. Then the concentration solution is discharged from the lower portion of the chamber for circulation.

14 Claims, 5 Drawing Sheets

(a)

(b)

ABSORPTION TYPE REFRIGERATOR

BACKGROUND OF THE INVENTION

1. Field of the Invention

The present invention relates to an absorption type refrigerator, and more particularly to an absorption type refrigerator which has an improved heat-exchange efficiency and is compact and relatively inexpensive.

2. Background

Co-pending U.S. application Ser. No. 07/911,554 discloses a heat exchange device for an absorption type refrigerator, which includes a wave-like shape bellows-fin formed by consecutively bending a thin plate and seal plates attached to ends of the bellows-fin for sealingly separating chambers disposed on opposite sides of the bellows-fin. The present invention is directed to the use of this heat-exchange device as a (high-temperature) generator.

A conventional (high-temperature) generator is constructed as shown in FIGS. 6(a) and 6(b), where FIG. 6(a) is a cross-sectional view of the generator and FIG. 6(b) is a perspective view of an internal portion thereof. A furnace tube portion 19 and a smoke tube portion 20 are provided within a drum 18 and submerged in solution so as to function as heat transmitting tubes. The furnace tube portion 19 and the exhaust pipe portion 20 are connected at their ends to a tube plate by soldering or the like so as to communicate with each other. As shown in FIG. 6(b), the furnace tube portion 19 is provided at its one end with a burner 1 which mixes and burns the supplied fuel and air and moves the generated combustion gas from the furnace tube portion 19 through the exhaust pipe portion 20. The combustion gas is heat-exchanged with the solution through the heat transmitting tubes during the movement thereof, and thereafter discharged as an exhaust gas. On the other hand, the solution is introduced into the inside of the drum through a diluted solution inlet 3, generates refrigerant vapor through the heat-exchange with the combustion gas, is converted into medium concentration solution and is discharged from a medium concentration solution outlet 4. The generated refrigerant vapor is discharged from the refrigerant vapor outlet 5 provided in an upper portion of the drum.

However, a conventional (high-temperature) generator of the absorption type refrigerator has the following disadvantages. The generator cannot perform sufficient heat exchange since the liquid level is relatively high, above the top of the smoke pipe, making it difficult to boil the solution. Therefore, a large amount of solution is necessary, resulting in a high cost. Since the amount of the solution is relatively large, the heat quantity required for heating the solution must be increased, and therefore, the set-up or build-up time must be lengthened further increasing the cost. Further, since the heat is likely to be transmitted to the pipe plate, the soldering portion between the furnace tube and the smoke pipe must be increased in strength against the thermal stress applied thereto. Therefore, the furnace tube and the smoke pipe must be relatively thick, resulting in yet additional costs. In view of the assembling process employing the soldering process, it is difficult to reduce the size of the generator.

The present invention was made in order to solve the problems mentioned above. An object of the present invention is to provide an absorption type refrigerator in which a (high-temperature) generator has an improved heat-exchange efficiency and is relatively compact and inexpensive.

SUMMARY OF THE INVENTION

In order to attain the above-noted objects, a (high-temperature) generator provided in an absorption type refrigerator according to the present invention is constructed using a heat-exchanger made up of a bellows-fin formed by consecutively bending a thin plate into a wave-like form and seal plates attached to ends of the bellows-fin for sealingly separating chambers disposed on opposite sides of the bellows-fin. Further, in constructing the generator using the heat-exchanger, the bellows-fin is transversely arranged so that a lower one of the chambers defined by the bellows-fin is used as a combustion chamber and an exhaust path for a burner whereas a diluted solution is introduced into an upper chamber and discharged therefrom for circulation after generating vapor refrigerant and being converted into concentration solution. Alternatively, the bellows-fin is vertically arranged so that one of the chambers disposed on one side of the bellows-fin is used as the burner combustion chamber and exhaust path in which gas flows vertically from a lower portion to an upper portion thereof whereas the diluted solution is dripped vertically from an upper portion of the other chamber to form liquid layer to be boiled and evaporated to generate vapor refrigerant and then discharged as the concentration solution from the lower portion of the chamber for circulation.

According to the invention as described above, the solution and the combustion gas flow in opposite directions in the respective chambers defined by the wave-like form bellows-fin formed as described above, so that the contact area can be substantially increased, resulting in a remarkable increase in heat-exchange efficiency. Further, since one of the chambers can serve also as the burner combustion chamber and exhaust path, the entire device can be reduced in size and weight, so that the device can be manufactured at a reduced cost.

DETAILED DESCRIPTION OF THE PREFERRED EMBODIMENTS

Figure 1:
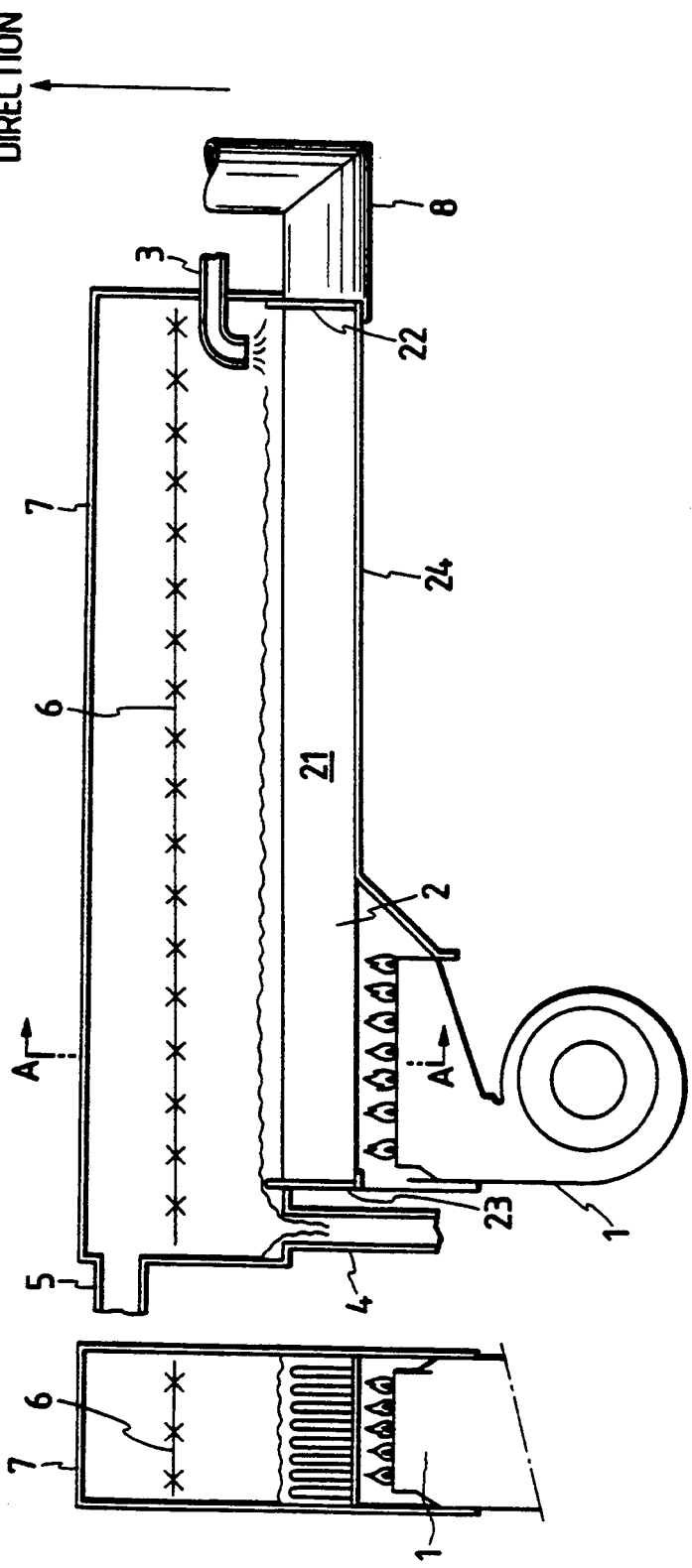
FIG. 1 shows a schematical view of a generator provided in an absorption type refrigerator, which is an embodiment of the present invention.
Figure 2:
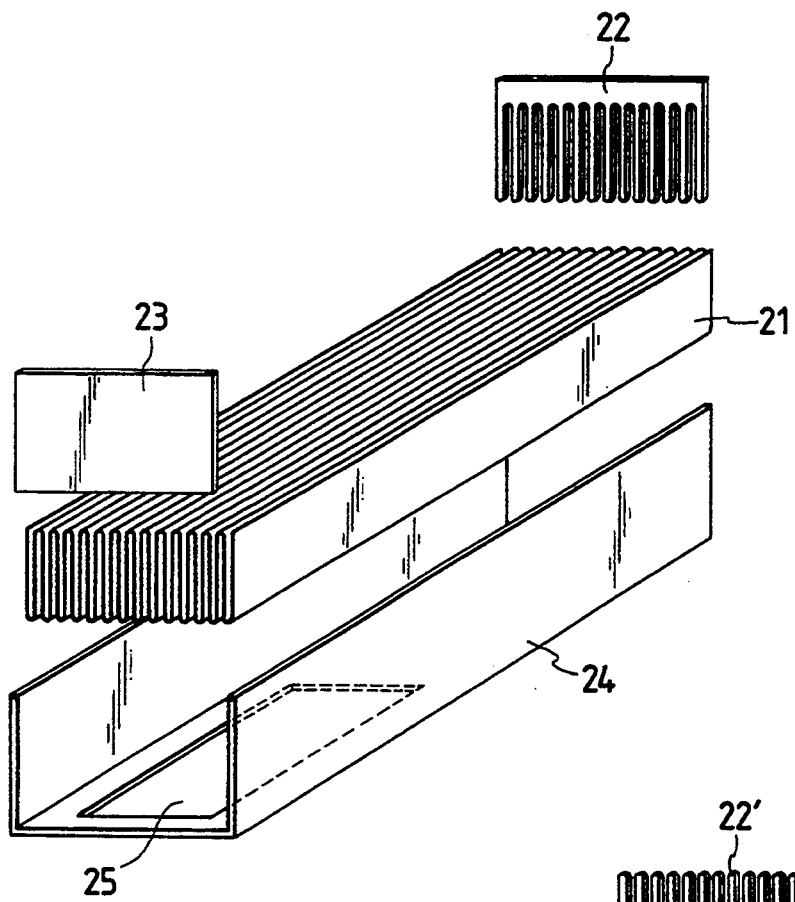
FIG. 2 is a perspective view of a heat-exchange portion of FIG. 1.
Figure 5:
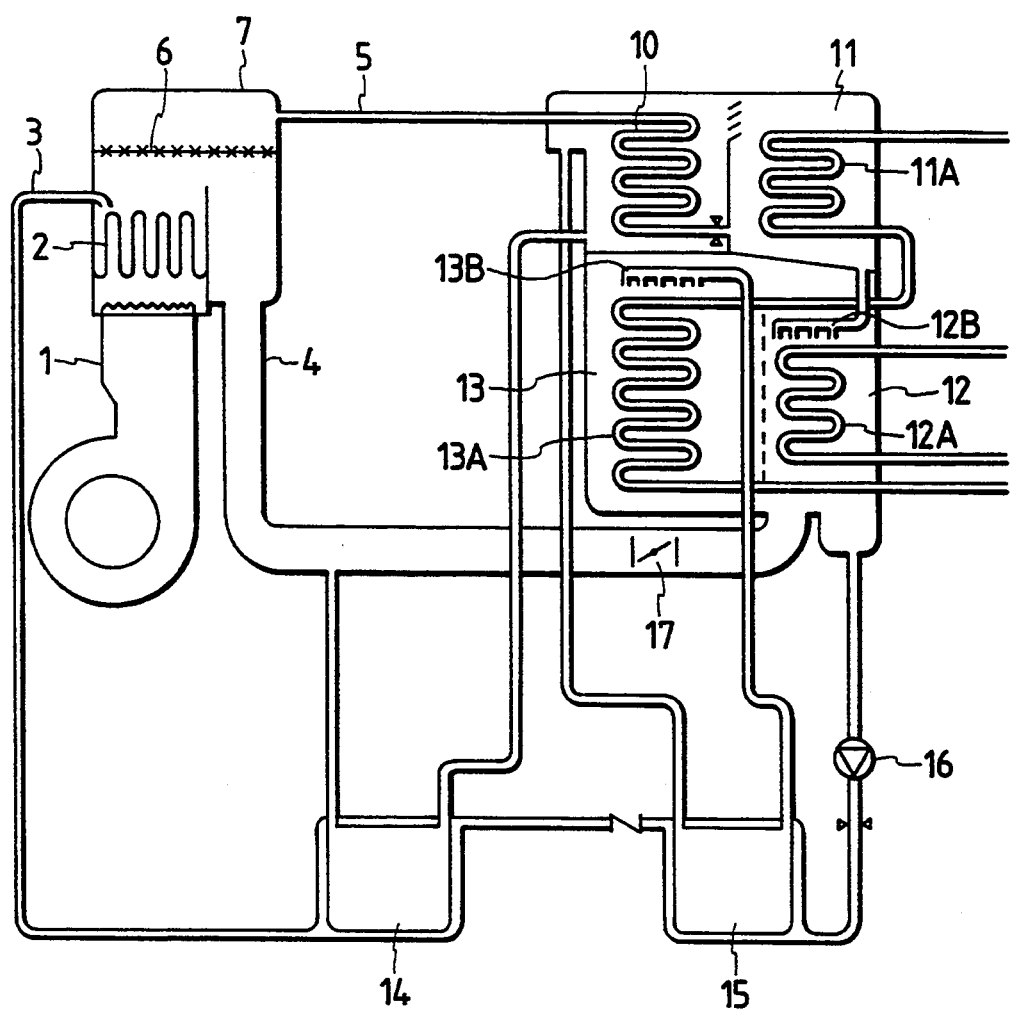
FIG. 5 shows an example in which a generator for an absorption type refrigerator according to the present invention is applied to a double effect absorption type refrigerator.
Figure 6:
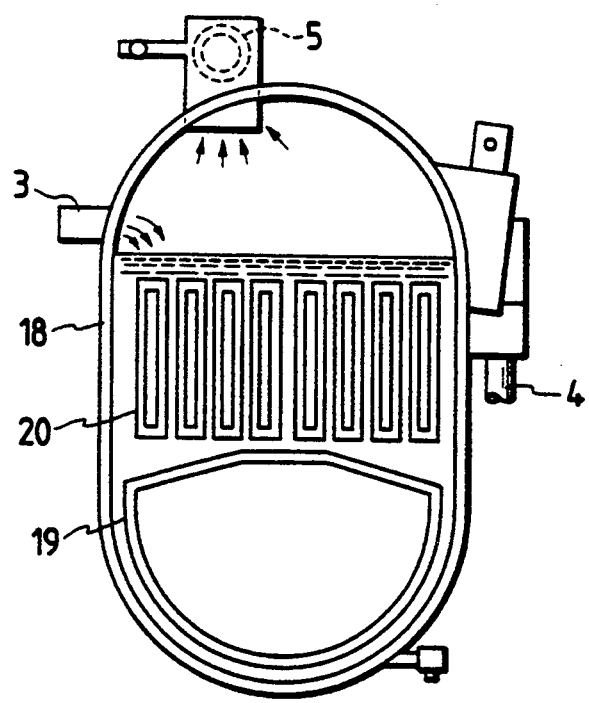
FIG. 6 shows a conventional heat exchanger.
Figure 6:
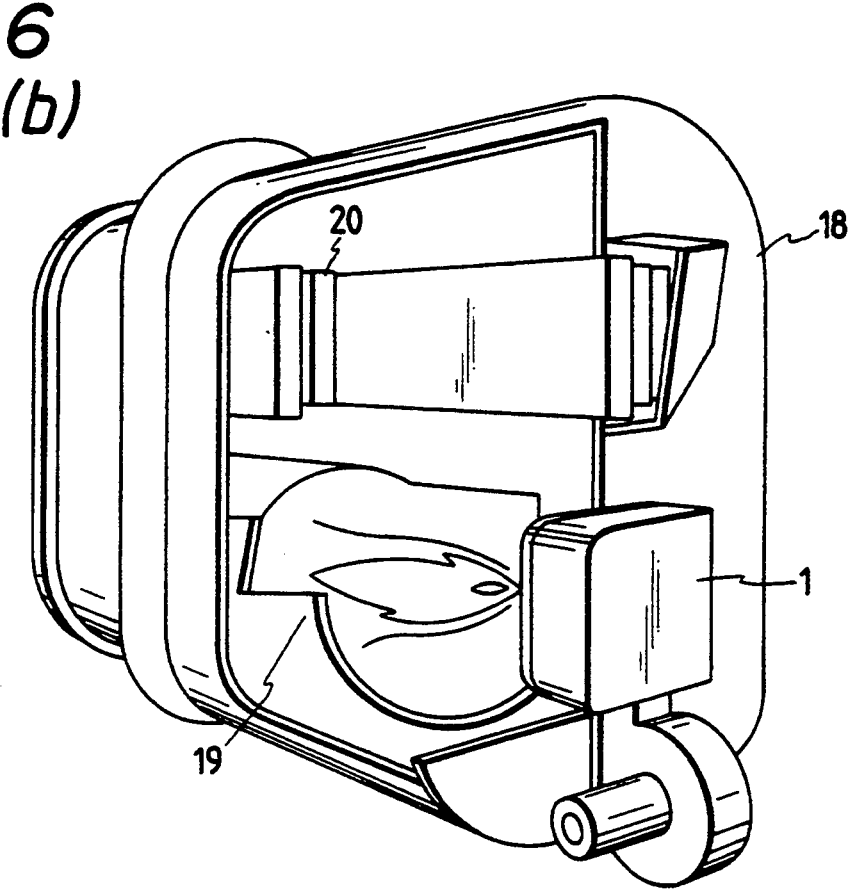

Embodiments of the present invention will be described hereinafter with reference to the drawings. The present invention can be applied to both a single-effect absorption type refrigerator and a double-effect absorption type refrigerator. In FIGS. 1 to 3, the present invention is described in regard to the single-effect absorption type refrigerator, and an example in which the present invention is applied to the double-effect absorption type refrigerator is shown in FIG. 5.

Prior to the explanation of the embodiment of the present invention, the construction of the single-effect absorption type refrigerator is now described. Solution composed of lithium nitride or the like as an absorption liquid and water as refrigerant is used. The solution when absorbing the refrigerant sufficiently becomes diluted solution. The single-effect absorption type refrigerator generally includes: a generator in which the diluted solution is heated by a heat source to generate vapor refrigerant and converted into concentration solution; a condenser in which the vapor refrigerant generated in the generator is cooled and liquified to provide liquid refrigerant; an evaporator in which the liquid refrigerant supplied from the condenser is dispersed and evaporated onto a water-cooling device from which cooled water is obtained utilizing evaporative heat; an absorber in which the concentration solution obtained in the generator and subjected to the heat-exchange in solution heat-exchanger is dispersed so as to absorb the vapor refrigerant evaporated in the evaporator; and a solution circulating pump for supplying diluted solution, which has absorbed refrigerant in the absorber, to the generator through a solution heat-exchanger.

The present invention relates to a generator provided in the absorption type refrigerator of this kind. Hereinafter, embodiments of the present invention are described.

FIGS. 1(a) and (b) illustrate a generator in which a bellows-fin is transversely arranged, where FIG. 1(a) is a front sectional view thereof, and FIG. 1(b) is a cross-sectional view taken along line A—A of FIG. 1. FIG. 2 is a perspective view of a heat-exchange portion of the generator. In these figures, the generator includes a burner 1 for fuel combustion; a heat-exchanger integrally made up of a bellows-fin 21 formed by consecutively bending a thin plate having excellent heat conductive properties into a wave-like form and seal plates 22 and 23 sealingly attached to ends of the bellows-fin for separating chambers formed by crest and bottom portions of the bellows-fin 21 such that the chambers are disposed on opposite sides of the bellows-fin; an inlet 3 for introducing diluted solution which is supplied from an absorber through a solution heat-exchanger; a concentration solution outlet 4 through which the concentration solution is discharged after the diluted solution is subjected to the heat-exchange with combustion gas to generate vapor refrigerant; a vapor refrigerant outlet provided in an upper portion of the generator; a demister 6 for separating, from the vapor refrigerant, solution which is conveyed together with the vapor refrigerant; an outer drum 7 for defining a heat-exchange chamber of the solution-side in cooperation with the bellows-fin 21; an exhaust pipe 8 for discharging the combustion gas as the exhaust gas; and a side plate 24 for defining a combustion chamber and an exhaust path through which the combustion gas passes in cooperation with the bellows-fin 21. In addition, the side plate 24 is formed with an opening 25 through which a flame of the burner and the combustion gas are introduced.

The operation of the generator thus constructed is now described. The diluted solution is introduced through the diluted solution inlet 3 into an upper chamber defined by the bellows-fin 21 and the outer drum 7, and heat-exchanged with the combustion gas, which passes through the lower chamber defined by the bottom portion of the bellows-fin 21 and the seal plates 22 and 23. This heat exchange results in the generation of the vapor refrigerant and the conversion of the diluted solution to a concentration solution. The concentrated solution flows over the seal plate 23 and is supplied to the concentration solution outlet 4. On the other hand, the generated vapor refrigerant is completely separated from the solution by the demister 6 and discharged through the vapor refrigerant outlet 5. The combustion gas flows in a direction opposite to a direction in which the diluted solution flows, as shown in FIG. 1(a), so that the heat-exchange efficiency is enhanced. The combustion gas, which has been subjected to the heat-exchange, is discharged as exhaust gas from the discharge pipe 8 outside the generator.

Figure 4:
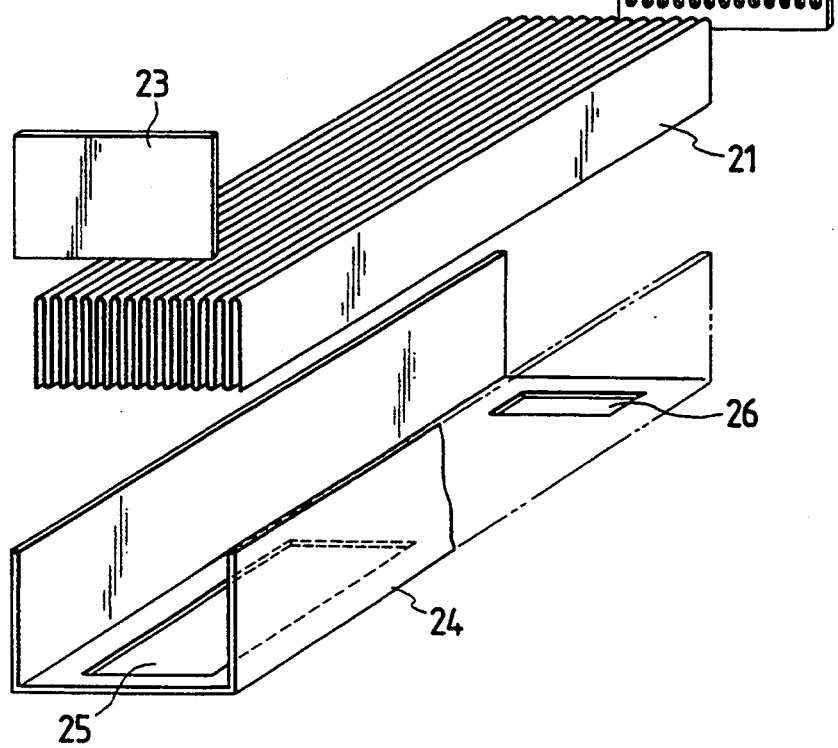
FIG. 4 is a perspective view of a heat-exchange portion of FIG. 3.
Figure 3A:
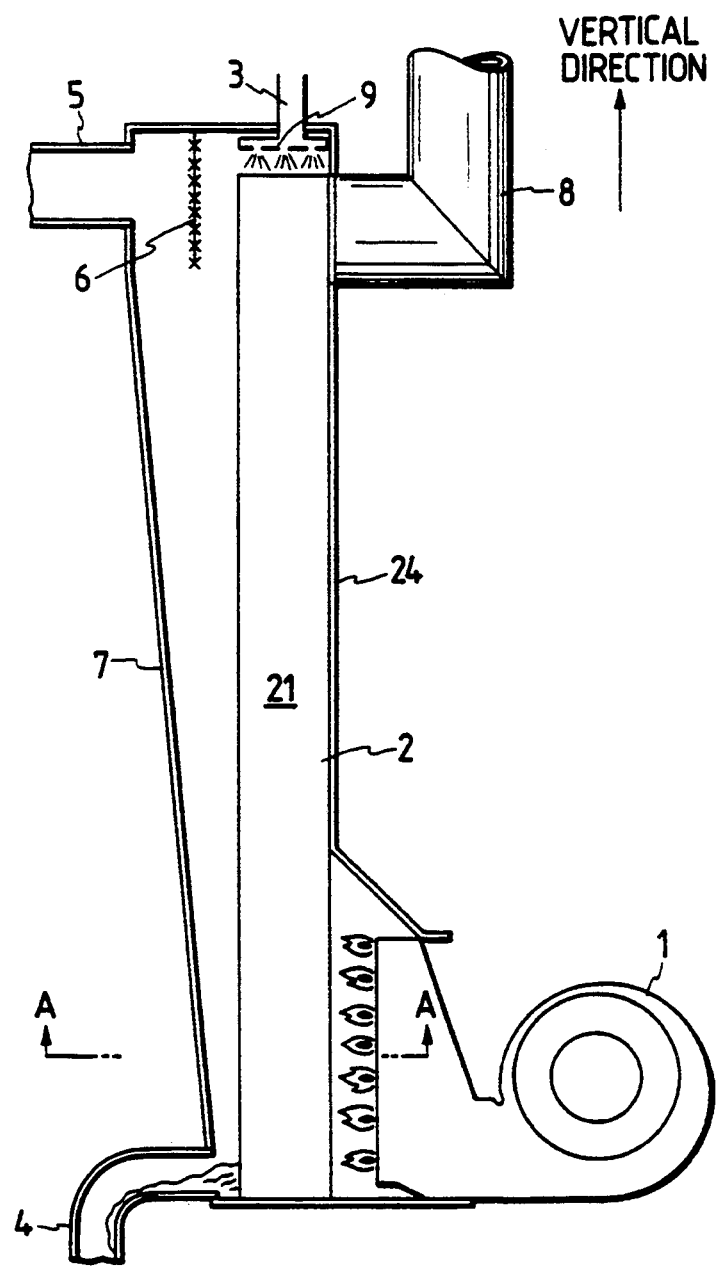
FIG. 3 shows a schematical view of a generator provided in an absorption type refrigerator, which is another embodiment of the present invention.
Figure 3B:
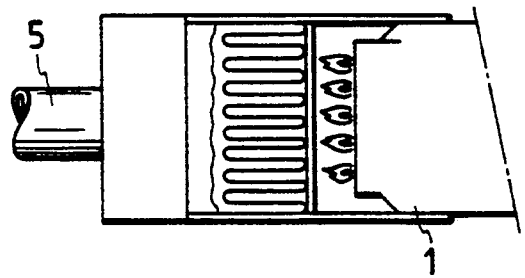

FIGS. 3(a) and (b) show a generator in which the bellows-fin is arranged vertically, where FIG. 1(a) is a front sectional view and FIG. 1(b) is a cross-sectional view taken along line A—A. FIG. 4 is a perspective view of a heat-exchange portion thereof. In these figures, the generator includes a burner 1 for fuel combustion; a heat-exchanger including a bellows-fin 21 integrally formed by consecutively bending a thin plate having excellent heat conductive property into a wave-like form and seal plates 22' and 23 sealingly attached to ends of bellows-fin for separating chambers formed by the bellows-fin 21; a diluted solution inlet 3 provided in an upper portion of the generator for introducing diluted solution supplied from an absorber into the solution heat-exchanger; a concentration solution outlet 4 through which concentration solution is discharged after the diluted solution is subjected to the heat-exchange with combustion gas to generate vapor refrigerant; a vapor refrigerant outlet 5 provided in an upper portion of the generator; a demister 6 for separating, from the vapor refrigerant, solution which is conveyed together with the vapor refrigerant; an outer drum 7 for defining a heat-exchanger chamber of the solution-side in cooperation with the bellows-fin 21; an exhaust pipe 8 for discharging the combustion gas as the exhaust gas; a side plate 24 for defining in cooperation with the bellows-fin 21 a combustion chamber and an exhaust path through which the combustion gas passes; a dispersing dripper 9 for forming on the wall of the bellows-fin 21 a liquid-thin film of the diluted solution introduced through the diluted solution inlet 3. The dispersing dripper 9 may be a spray type. In addition, the side plate 24 is formed with an opening 25 through which a flame of the burner and the combustion gas are introduced, and another opening 26 located above the opening 25, to which the discharge pipe 8 is connected. As shown in FIG. 4, the seal plate 22' is provided to also act as a seal for the exhaust gas.

The operation of the generator thus constructed is described. The diluted solution is first introduced through the diluted solution inlet 3, distributed uniformly along the wall of the bellows-fin 21 by the dispersing dripper 9, and heat-exchanged with the combustion gas, which passes inside the chamber forming the combustion chamber and smoke path, on a portion of the heat exchanger 2 made up of the bellows-fin 21 and the seal plate 22' and 23. This heat exchange generates the vapor refrigerant from the diluted solution so as to convert the diluted solution into concentration solution. The concentration solution is then discharged from the concentration solution outlet 4 provided in a lower portion of the generator. On the other hand, the generated vapor refrigerant is completely separated from the solution by the demister 6 and discharged from the vapor refrigerant outlet 5. In this embodiment, the flow direction of the diluted solution is opposite to the flow direction of the combustion gas, so that the heat-exchange efficiency is enhanced. The combustion gas which has been subjected to the heat-exchange is discharged outwardly as the exhaust gas from the exhaust pipe 8.

Next, a case where the generator is applied to the double-effect absorption type refrigerator is explained with reference to FIG. 5. FIG. 5 show an example of the generator in which the bellows-fin is arranged transversely. The generator is designed to also function as a separator used in a conventional double-effect absorption type refrigerator. As explained in regard to FIGS. 1(a), 1(b) and 2, the solution flowing inwardly through the diluted solution inlet 3 is heat-exchanged with the combustion gas in the heat-exchanger 2 to generate vapor refrigerant, converted into the medium-concentration solution, and discharge from the medium-concentration solution outlet 4.

On the other hand, the generated vapor refrigerant is separated from the solution by the demister 6 and discharged from the vapor refrigerant outlet 5. The discharged medium-concentration solution is supplied to the high-temperature exchanger 14 whereas the vapor refrigerant is supplied to the low-temperature generator 10. In the low-temperature generator 10, the medium-concentration solution whose temperature has been lowered by the high-temperature heat exchanger 14, is heated again by the vapor refrigerant supplied from the vapor refrigerant outlet 5 so that the vapor refrigerant is further generated from the medium-concentration solution. The thus generated vapor refrigerant is supplied to the condenser 11. The medium-concentration solution is converted into the concentration solution.

The vapor refrigerant supplied from the vapor refrigerant outlet 5 is partially condensed to provide liquid refrigerant which is supplied to the condenser 11. In the condenser 11, both the vapor refrigerant generated in the low-temperature generator 10 and the vapor refrigerant which has not been converted into the liquid refrigerant in the low-temperature generator 10 are cooled and liquified by the cooling water to provide liquid refrigerant which is supplied to the evaporator 12. In the evaporator 12, there is disposed a heat conductive pipe (water-cooling device) 12A inside which circulating water to be cooled flows. The liquid refrigerant supplied from the condenser 11 is dispersed onto the heat-conductive pipe 12A using the dripper 12B so that the circulating water is cooled utilizing evaporative heat generated when the liquid refrigerant is converted into the vapor refrigerant. In the absorber 13, the concentration solution introduced from the low-temperature generator 10 through the low-temperature heat-exchanger 15 is dispersed and dripped using dripper 13B so that the concentration solution absorbs the vapor refrigerant evaporated in the evaporator 12. The absorption in the absorber 13 functions to secure a high vacuum effect of the evaporator 12, so that the liquid refrigerant dispersed onto the heat-conductive pipe 12A of the evaporator 12 can be immediately evaporated. Further, in the absorber 13, there is provided a cooling means 13A for cooling the concentration solution and converting the concentration solution into the diluted solution. The cooling means 13a is made up of a coiled pipe and communicates with a cooling means 11A provided in the condenser 11. The cooling water is circulated inside the cooling means. The medium-concentration solution having a high temperature is heat-exchanged with the diluted solution having a low temperature in the high-temperature solution heat-exchanger 14 and the concentration solution having a high temperature is heat-exchanged with the diluted solution having a low-temperature in the low-temperature solution heat-exchanger 15 so that the solution heat exchanger is divided into two stages including upper and lower portions to improve heat-exchange efficiency. The solution circulating pump 16 supplies the diluted solution, which has absorbed vapor refrigerant therein in the absorber 13, through the low-temperature solution heat-exchanger 15 and the high-temperature solution heat-exchanger 14 to the high-temperature generator to circulate the solution again.

In addition, reference numeral 17 denotes a cooling and heating cycle switch valve disposed in a midportion of a connection pipe connecting the medium-concentration solution outlet 4 to the evaporator 12 and the absorber 13. During the heating cycle, the vapor refrigerant and the medium-concentration solution, both generated in the high-temperature generator and having a high-temperature, are directly supplied to the evaporator 12 so as to be heat-exchanged with the circulating water through the heat-conductive pipe (water-heating device) 12A to provide heated water.

As described above, the absorption type refrigerator according to the present invention produces the following effect. Since it is possible to manufacture the (high-temperature) generator with simple construction, the entire device can be reduced in size and weight. Since the solution, when heat-exchanged with the combustion gas, is easily boiled due to the relatively shallow level of the solution, the heat-exchange efficiency is excellent. Further, since the flow direction of the solution is opposite to the flow direction of the combustion gas in this heat-exchange operation, the heat-exchange efficiency is excellent. Finally, since it is possible to reduce the amount of the solution introduced into the chamber for generating the vapor refrigerant, the device is much more economical.

We claim:

1. A single-effect absorption type refrigerator, comprising:

a generator for heating diluted solution using a heat generating means and generating vapor refrigerant from the diluted solution so that the diluted solution is converted into concentration solution;

a condenser for cooling and liquefying the vapor refrigerant generated in the generator to provide liquid refrigerant;

an evaporator for dispersing onto a cooling device the liquid refrigerant supplied from the condenser to provide cooled water;

an absorber in which the concentration solution supplied from the generator and subjected to heat-exchange process in a solution heat-exchanger is dispersed to absorb the vapor refrigerant evaporated in the evaporator; and a solution circulating pump for supplying diluted solution, which has absorbed the refrigerant in the absorber, to the generator through a solution heat-exchanger, wherein said generator includes a heat-exchanger including a billows-fin formed by consecutively bending a thin plate into a wave-like form extending a longitudinal direction with the bends extending in a direction transverse to the longitudinal direction, and seal plates sealingly attached to opposite transverse ends of said billows-fin for defining a pair of chambers disposed on opposite sides thereof, wherein one of the chambers is a combustion chamber which defines an exhaust path along which heat flows in the transverse direction and another one of said chambers is a solution chamber through which the diluted solution flows in the transverse direction, and wherein said generator further includes a diluted solution inlet through which the diluted solution is introduced into said solution chamber, a concentration solution outlet through which the concentration solution is supplied from said solution chamber to said absorber, a vapor refrigerant outlet for communicating said solution chamber with said condenser, and an exhaust outlet for exhausting the exhaust gas, generated by said heat generating means, from said combustion chamber.

2. The absorption type refrigerator according to claim 1, wherein said bellows-fin is horizontally arranged so that a lower one of the chambers is used as said combustion chamber and said exhaust path whereas an upper one of the chambers is used as said solution chamber through which the diluted solution flows, wherein vapor refrigerant is generated from the diluted solution resulting in a concentrated solution which is discharged as the concentration solution for circulation.

3. The absorption type refrigerator according to claim 1, wherein said bellows-fin is vertically arranged so that one of the chambers is used as said combustion chamber and said exhaust path in which said exhaust gas from said heat generating means flows vertically from a lower portion to an upper portion of the chamber whereas the diluted solution is dripped from an upper portion of the other chamber to form liquid layer falling film to be boiled and evaporated to generate vapor refrigerant and the concentration solution is discharged from the lower portion of the chamber for circulation.

4. The absorption type refrigerator according to claim 2, wherein said generator includes a demister for separating said vapor refrigerant from said solution.

5. The absorption type refrigerator according to claim 3, wherein said generator includes a dripper disposed at a top portion of said generator for dripping said diluted solution.

6. The absorption type refrigerator according to claim 2, wherein an exhaust gas from said heat generating means flows through said heat exchanger in a direction opposite to a direction in which said diluted solution flows through said heat exchanger.

7. A double-effect absorption type refrigerator, comprising:
a high-temperature generator for heating diluted solution using a heat generating means and generating vapor refrigerant from the diluted solution so that the diluted solution is converted into medium concentration solution;
a high-temperature heat exchanger for performing heat-exchange between said medium concentration solution supplied from said high-temperature generator and said diluted solution;
a low-temperature generator for heating said medium concentration solution, whose temperature is lowered in said high-temperature heat exchanger, by said vapor refrigerant supplied from said generator so that refrigerant in the form of vapor is generated from said medium concentration solution to convert said medium concentration solution to concentration solution;
a condenser for cooling and liquefying said refrigerant in the form of vapor generated in said low-temperature regenerator;
an evaporator for dispersing said refrigerant in the form of vapor supplied from said condenser onto a cooling device to obtain cool water from said cooling device;
an absorber for dispersing said concentration solution supplied from said low-temperature regenerator through a low-temperature heat exchanger subjecting said concentration solution to heat-exchange, so that said concentration solution absorbs said refrigerant in the form of vapor evaporated in said evaporator; and
a solution circulating pump for supplying diluted solution, which has absorbed said refrigerant to said high-temperature generator, wherein said high-temperature generator includes a heat-exchanger including a billows-fin formed by consecutively bending a thin plate into a wave-like form extending in a longitudinal direction with the bends extending in a direction transverse to the longitudinal direction, and seal plates sealingly attached to opposite transverse ends of said billows-fin for defining a pair of chambers disposed on opposite sides thereof, wherein one of the chambers is a combustion chamber which defines an exhaust path along which said heat flows in the transverse direction and another one of said chambers is a solution chamber through which the diluted solution flows in the transverse direction, and wherein said generator further includes a diluted solution inlet through which the diluted solution is introduced into said solution chamber, a concentration solution outlet through which the concentration solution is supplied from said solution chamber to said absorber, a vapor refrigerant outlet for communicating said solution chamber with said condenser, and an exhaust outlet for exhausting the exhaust gas, generated by said heat generating means, from said combustion chamber.

8. The refrigerator according to claim 7, wherein said bellows-fin is horizontally arranged so that said lower one of the chambers is used as a combustion chamber and said exhaust path whereas an upper one of the chambers is used as said solution chamber through which the diluted solution flows, wherein vapor refrigerant is generated from the diluted solution resulting in a medium concentrated solution which is discharged as the medium concentration solution for circulation.

9. The absorption type refrigerator according to claim 7, wherein said bellows-fin is vertically arranged so that one of the chambers is used as said combustion chamber and said exhaust path in which said exhaust gas from said heat generating means flows vertically from a lower portion to an upper portion of the chamber whereas the diluted solution is dripped from an upper portion of the other chamber to form liquid layer falling film to be boiled and evaporated to generate vapor refrigerant and the medium concentration solution is discharged from the lower portion of the chamber for circulation.

10. The single-effect absorption type refrigerator according to claim 1, wherein said generator further includes means for accumulating the diluted solution at a predetermined liquid level within said solution chamber and permitting the concentration solution to flow over said means toward said concentration solution outlet.

11. The single-effect absorption type refrigerator according to claim 10, wherein said means is one of said sealing plates proximate said concentration solution chamber.

12. The single-effect absorption type refrigerator according to claim 10, wherein said heat generating means includes a burner attached to said generator so that combustion is performed within said combustion chamber.

13. A compact generator unit equipped with a heat generating means, adapted to be used in an absorption type refrigerator and designed to heat diluted solution to provide concentration solution and vapor refrigerant, said generator comprising:

a casing means including a diluted solution inlet, a vapor refrigerant outlet, a concentration solution outlet and an exhaust outlet;

a heat-exchanger disposed within said casing means, and including a billows-fin formed by consecutively bending a thin plate into a wave-like form extending a longitudinal direction with the bends extending in a direction transverse to the longitudinal direction, and seal plates sealingly attached to opposite transverse ends of said billows-fin for defining a pair of chambers disposed on opposite sides thereof within said casing means, wherein one of the chambers is a combustion chamber which defines an exhaust path along which heat flows in the transverse direction toward said exhaust outlet and another one of said chambers is a solution chamber through which the diluted solution from said diluted solution inlet flows in the transverse direction;

solution retention means for accumulating the diluted solution at a predetermined liquid level within said solution chamber and permitting the concentration solution to flow over said retention means toward said concentration solution outlet; and a burner attached to said casing means so that combustion is performed within said combustion chamber.

14. The generator unit according to claim 13, wherein said retention means is one of said sealing plates proximate said diluted solution outlet.

* * * * *